United States Patent
Soller et al.

(10) Patent No.: US 10,024,261 B2
(45) Date of Patent: Jul. 17, 2018

(54) METHOD AND DEVICE FOR OPERATING A DRIVE SYSTEM FOR A MOTOR VEHICLE

(71) Applicant: Robert Bosch GmbH, Stuttgart (DE)

(72) Inventors: Tobias Soller, Ismaning (DE); Gabor Pongracz, Vienna (AT); Matthias Schueler, Steinheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 80 days.

(21) Appl. No.: 15/245,305

(22) Filed: Aug. 24, 2016

(65) Prior Publication Data

US 2017/0058806 A1 Mar. 2, 2017

(30) Foreign Application Priority Data

Aug. 27, 2015 (DE) .................. 10 2015 114 251

(51) Int. Cl.
| | |
|---|---|
| *F02D 41/04* | (2006.01) |
| *F02D 41/00* | (2006.01) |
| *F02D 41/10* | (2006.01) |
| *F02D 41/12* | (2006.01) |
| *F02D 41/30* | (2006.01) |
| *F02D 31/00* | (2006.01) |
| *B60W 20/10* | (2016.01) |
| *F02D 41/34* | (2006.01) |

(52) U.S. Cl.
CPC .......... *F02D 41/045* (2013.01); *B60W 20/10* (2013.01); *F02D 31/009* (2013.01); *F02D 41/0097* (2013.01); *F02D 41/10* (2013.01); *F02D 41/123* (2013.01); *F02D 41/30* (2013.01); *B60W 2710/0616* (2013.01); *B60W 2710/0666* (2013.01); *B60Y 2200/92* (2013.01); *B60Y 2300/432* (2013.01); *B60Y 2300/53* (2013.01); *F02D 41/345* (2013.01); *F02D 2200/101* (2013.01); *F02D 2200/1012* (2013.01); *F02D 2250/26* (2013.01); *Y10S 903/905* (2013.01)

(58) Field of Classification Search
CPC .... F02D 41/045; F02D 41/0097; F02D 41/10; F02D 41/30; F02D 31/009; B60W 20/10
USPC ........................................... 701/22
See application file for complete search history.

(56) References Cited

U.S. PATENT DOCUMENTS

| | | | | |
|---|---|---|---|---|
| 4,743,072 | A * | 5/1988 | Brearley | B60T 8/1708 303/128 |
| 6,513,492 | B1 * | 2/2003 | Bauerle | F02D 9/02 123/396 |
| 8,577,584 | B2 * | 11/2013 | Gwinner | F02D 41/22 123/399 |
| 2014/0229049 | A1 * | 8/2014 | Horst | B60W 30/188 701/22 |

(Continued)

*Primary Examiner* — Yazan A Soofi
(74) *Attorney, Agent, or Firm* — Norton Rose Fulbright US LLP; Gerard Messina

(57) ABSTRACT

A method for operating a drive system having at least one drive engine for a motor vehicle, having the following: carrying out an acceleration monitoring of the motor vehicle, a changeover to an alternative monitoring being made when the acceleration monitoring can no longer carry out a reliable monitoring, and, in the alternative monitoring, an engine rotational speed being limited to a maximum permissible engine rotational speed; and ascertaining the maximum permissible rotational speed as a function of a rotational speed specification specified by a driver's request.

15 Claims, 1 Drawing Sheet

(56) References Cited

U.S. PATENT DOCUMENTS

2015/0217753 A1* 8/2015 Heyl .................... B60W 10/06
 701/22
2015/0361909 A1* 12/2015 Kuroki .................. F02D 29/02
 701/101

* cited by examiner

METHOD AND DEVICE FOR OPERATING A DRIVE SYSTEM FOR A MOTOR VEHICLE

RELATED APPLICATION INFORMATION

The present application claims priority to and the benefit of German patent application no. 10 2015 114 251.1, which was filed in Germany on Aug. 27, 2015, the disclosure of which is incorporated herein by reference.

FIELD OF THE INVENTION

The present invention relates to drive systems for motor vehicles, in particular measures for carrying out an alternative monitoring during monitoring for undesired accelerations of the motor vehicle.

BACKGROUND INFORMATION

In order to prevent an undesired acceleration of a motor vehicle due to a software or hardware error in the engine control device, an error monitoring unit is provided. The error monitoring unit can include a torque-based monitoring, an energy-based or performance-based monitoring, and an acceleration-based monitoring, in particular a three-level monitoring.

In torque-based monitoring, by comparing comparison quantities generated via various torque calculation paths, an excessively high specification of a quantity of fuel that is to be injected to the internal combustion engine can be ascertained, which can result in an unintentional acceleration of the vehicle, i.e. one not desired by the driver.

In an acceleration-based monitoring, an acceleration signal in the motor vehicle can be evaluated. For this purpose, the real driving acceleration and the rotational acceleration, calculated from the measured rotational speeds, of the drive train and of the wheels are compared to a permissible acceleration. The permissible acceleration is for example calculated from the driver's request, the demands of driver assistance systems and external control devices, braking torques, and driving resistances.

SUMMARY OF THE INVENTION

According to the present invention, a method is provided for operating a drive system having an acceleration monitoring of a vehicle according to the descriptions herein, and the device and the drive system according to the further descriptions herein are provided.

Further embodiments are indicated in the further descriptions herein.

According to a first aspect, a method is provided for operating a drive system having a drive engine for a motor vehicle, having the following tasks:
  carrying out a monitoring of the acceleration of the motor vehicle, a change being made to an alternative monitoring if the acceleration monitoring can no longer carry out a reliable monitoring, and in the alternative monitoring an engine rotational speed being limited to a maximum permissible engine rotational speed;
  ascertaining the maximum permissible engine rotational speed as a function of a rotational speed specification specified by a driver's request.

It can be provided that the maximum permissible engine rotational speed is ascertained such that its time gradient is limited to a prespecified maximum rotational speed gradient.

In addition, the maximum permissible engine rotational speed and a current engine rotational speed can be provided, such that when adopting and/or departing from the alternative monitoring, and/or during the alternative monitoring, the rotational speed gradient of the maximum permissible engine rotational speed is limited.

In particular, in the alternative monitoring a specified torque calculated from a torque calculation path from a specified driver's request can be limited to a limit torque, the limit torque being ascertained as a function of the driver's request, in particular according to a maximum rotational speed regulation based on a maximum permissible engine rotational speed that is a function of the driver's request.

An acceleration monitoring for a motor vehicle monitors to ensure that the motor vehicle is not accelerated in an undesired manner. If, during such a known acceleration monitoring, an error is determined in the calculation of the torque path, for example in the form of a deviation between an actual acceleration and a target acceleration, as a rule a shutting off of the engine system is requested.

When there is an error in the sensor system, with the result that a signal for calculating the acceleration monitoring is not available, or is available only with inadequate precision, or given operation in an operating range in which the acceleration monitoring cannot be reliably carried out, reliable monitoring can no longer be ensured. In this case, a monitoring reaction can be triggered in which a changeover is made to an alternative monitoring.

The alternative monitoring can provide that the engine rotational speed of the drive engine is limited to a maximum permitted engine rotational speed. The maximum permitted engine rotational speed can result from a specified driver's request, in particular a gas pedal position of the gas pedal actuated by the driver of the motor vehicle. The maximum permitted engine rotational speed can be forwarded to a maximum rotational speed regulator that, based on a difference between the maximum permissible engine rotational speed and the current engine rotational speed, ascertains a limit torque to which the specified torque requested by the torque calculation path is limited.

If the maximum permitted engine rotational speed is nonetheless exceeded by more than a specified rotational speed offset, e.g. due to an error in the rotational speed regulation, then in addition an injection shutoff can be requested. If the injection shutoff also does not result in a reduction of the engine rotational speed to or below the maximum permitted engine rotational speed that is a function of the gas pedal, a safety shutoff of the end stage that controls the injection valves can be carried out, and an engine shutoff can be initiated.

If, as monitoring reaction, such an alternative monitoring is adopted, this can cause bucking, thereby impairing driving comfort. In particular, bucking can occur during transition to the alternative monitoring if, at high rotational speeds, a complete injection shutoff is carried out, or if, given sudden adopting of the alternative monitoring, the maximum permitted engine rotational speed that is a function of the gas pedal position is exceeded. In addition, when the alternative monitoring is adopted, the pollutant emissions can increase, because safety-uncritical but emissions-relevant injections, necessary for example for catalytic converter heating if the engine is cold, can be prevented if the engine rotational speed is above the maximum permitted engine rotational speed that is a function of the gas pedal position.

An idea of the above method is to provide the alternative monitoring as rotational speed limitation that is a function of a specified driver's request, a maximum permissible engine rotational speed being correspondingly specified. This results in a limit torque determined with the aid of a maximum rotational speed regulation, to which torque the specified torque specified by the torque calculation path function, or the engine torque provided by the drive engine, is to be limited.

In the alternative monitoring, it can be provided that if the maximum permissible rotational speed is exceeded by a particular first offset value, a complete injection shutoff is carried out, in which the injection of fuel to all cylinders is prevented. It can be provided that between the maximum permissible engine rotational speed and this injection shutoff rotational speed limit, injections are permitted only as long as the rotational speed gradient of the actual engine rotational speed is smaller than the maximum rotational speed gradient. In this way, the injection shutoff rotational speed limit can be increased without infringing safety goals, and increases that are not critical with regard to emissions are permitted in a larger rotational speed range.

In order to avoid the abrupt change in the limit torque for limiting the engine torque upon adopting and/or when departing from the alternative monitoring, it can be provided to modify the maximum permissible engine rotational speed upon adopting, carrying out, or leaving the alternative monitoring not abruptly, but rather to modify it with a prespecified, in particular temporally monotonic, adaptation function, starting from the current engine rotational speed in the direction of a rotational speed specification specified by the driver's request, so that the gradient of the change of the maximum permissible engine rotational speed is limited. In this way, abrupt changes of the specified torque for the drive engine can be avoided, so that driving comfort is maintained even when an alternative monitoring is adopted.

In particular, upon each change of the rotational speed specification, or of the actual engine rotational speed, that would cause an abrupt reduction of the limit torque, the maximum permissible engine rotational speed can be modified according to a maximum temporal rotational speed gradient in such a way that the resulting limit torque does not cause an abrupt change in the limited specified torque.

According to a specific embodiment, in the alternative monitoring, when an injection shutoff rotational speed limit is exceeded by the current engine rotational speed, an injection shutoff is carried out, such that between a rotational speed that is a function of the maximum permissible engine rotational speed and the injection shutoff rotational speed limit, injections are permitted only as long as a temporal gradient of the actual engine rotational speed is smaller than the maximum rotational speed gradient.

In addition, after adopting the alternative monitoring, the alternative monitoring is departed from if a quality test runs successfully, the quality test providing that, if an increase in the driver's request is requested, the provided rotational speed specification is held constant for a prespecified holding time duration, a successful running of the quality test being determined if, during the holding time duration, there does not result any change of the engine rotational speed, in particular no increase of the engine rotational speed (N).

Because when driving uphill a part of the engine performance is required to overcome the upward incline, the resulting acceleration, calculated from the wheel rotational speeds, in the error-free case is less than the acceleration that results given corresponding engine performance when traveling on a flat surface. That is, given a correspondingly steep incline, even in the case of torque error the resulting vehicle acceleration can be less than the permissible acceleration on a flat surface given the same driver's request. Therefore, based on the acceleration signal calculated from the wheels, one cannot reliably infer error-free operation, and for this reason a quality test can be provided in order to decide whether a change from alternative monitoring back to acceleration-based monitoring is safety-uncritical or not. This makes it possible to keep the dwell time spent in the alternative monitoring as short as possible, and to change quickly from the alternative monitoring back to the monitoring operating mode, which can increase driver comfort when there is an active driver's request.

The quality test is used to test the functional capacity of the level 1 functions in the torque path, e.g. the maximum rotational speed regulation and an associated limiting function for limiting the specified torque. The quality test can be carried out if a specified torque determined from the torque calculation path is limited by the limit torque determined by the rotational speed specification. Such a situation occurs for example if an increase in the driver's request is recognized, which in principle would cause, via the torque calculation path, an increase in the specified torque and thus an increase in rotational speed. The quality test is carried out when an increase in the driver's request is determined, in that for example the rotational speed specification is maintained or held constant for a holding time duration. The maximum rotational speed regulation correspondingly provides the limit torque to which the specified torque is limited. If, despite the increasing demand due to the increased driver's request, the engine rotational speed is successfully held to the rotational speed specification, the quality test has successfully been passed and the alternative monitoring can be departed from.

Alternatively or in addition, a successful run of the quality test cannot be determined if at least one of the following exception conditions is present:
- the maintenance of the permitted maximum permissible engine rotational speed is due to an activated injection shutoff.
- A brake pedal is actuated during the holding time duration, and injections take place simultaneously.
- In a hybrid drive system, a recuperated torque prevents or delays an increase in rotational speed of the drive engine with active injections.

In particular, a successful run of the quality test cannot be determined if one of the exception conditions is met with a particular frequency within the holding time duration.

In the following, specific embodiments are explained in more detail on the basis of the accompanying drawings.

DETAILED DESCRIPTION

Figure 1:
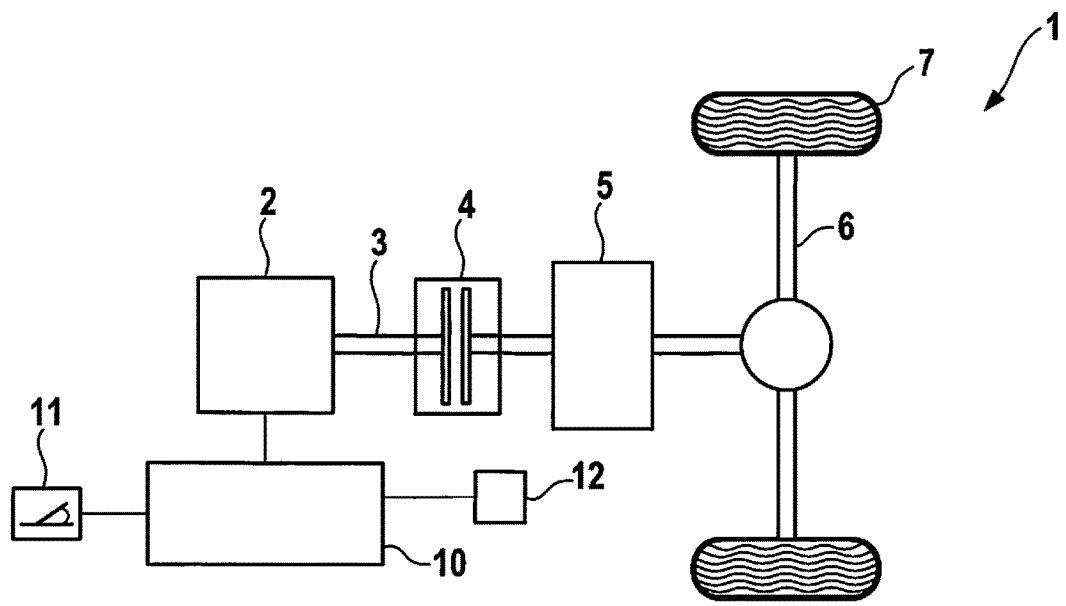
FIG. 1 shows a schematic representation of a drive system for a motor vehicle.

FIG. 1 shows a schematic representation of a drive system 1 having a drive engine 2, having a driven shaft 3 that is coupled, via a coupling 4 and a manual transmission 5 having a drive shaft 6 for driving driven wheels 7. Drive engine 2 can be fashioned as an internal combustion engine, in particular an air-guided internal combustion engine, and operated by an engine control device 10. In particular, drive system 1 can also be fashioned in the form of a hybrid drive system.

Engine control device 10 can be coupled to a gas pedal 11 in order to obtain an indication, via a gas pedal position, that specifies a driver's request, e.g. in the form of a requested torque. In regular operation, in engine control device 10 the driver's request resulting from the gas pedal position is converted into a specified torque according to known torque calculation path functions, and the torque is correspondingly specified into a fuel injection quantity for controlling injection valves of internal combustion engine 2 at control end stages.

A monitoring function is provided that can carry out a torque-based or acceleration-based monitoring of the torque calculation path function. The torque-based monitoring checks, through separate torque calculation paths, that the engine torque provided by drive engine 2 does not exceed a permissible engine torque.

In the case of an acceleration-based monitoring, it is checked whether the acceleration of the motor vehicle in which drive system 1 is used does not exceed a permissible acceleration. For this purpose, a real vehicle longitudinal acceleration, which can be measured for example using an acceleration sensor 12, is compared to the permissible acceleration. The permissible acceleration is calculated from the driver's request, the requests of driver assistance systems and external control devices, braking torques, a rotational acceleration of drive train 6 and of wheels 7 calculated from measured rotational speeds, and driving resistances. If there is a deviation that permits the inference of an acceleration of the motor vehicle that is higher than is allowed, then an alternative monitoring is adopted.

Figure 2:
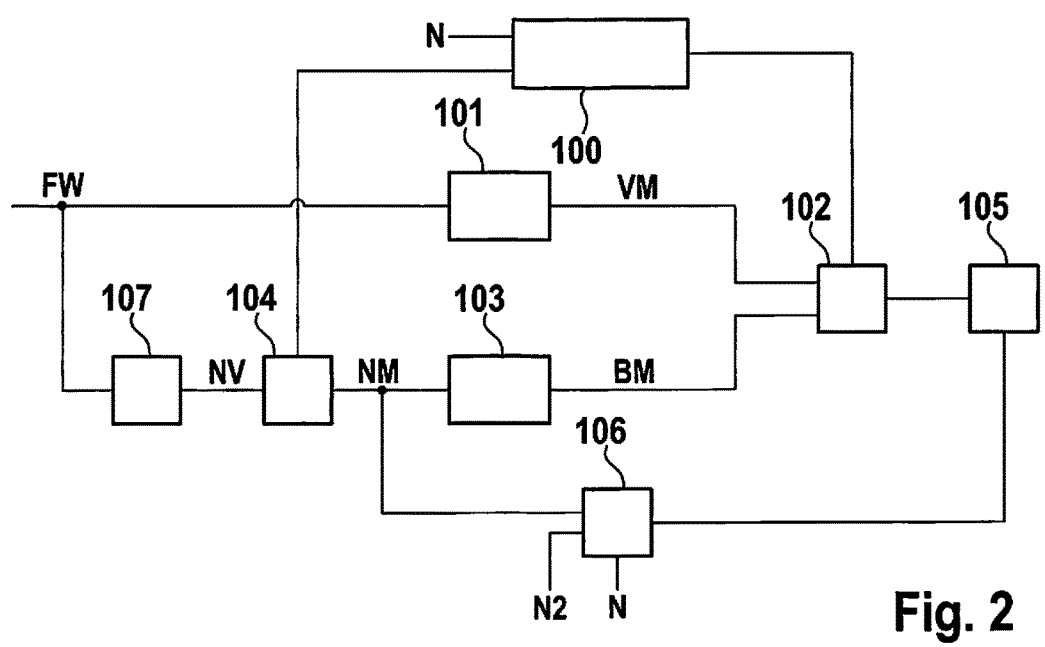
FIG. 2 shows a block diagram illustrating a function for operating the drive system with an alternative monitoring.

FIG. 2 shows a functional block diagram that shows the relevant functions relating to an acceleration monitoring.

Shown is torque path function block 101, which determines from the specified driver's request FW, ascertained for example from a gas pedal position, a specified torque VM to be realized by drive engine 2 in a known manner.

A monitoring block 100 is provided that carries out an acceleration monitoring according to the above-described monitoring function, and, in case of error, triggers an alternative monitoring.

When the alternative monitoring is adopted, the monitoring function activates a limiting element 102 that limits the specified torque VM provided by a torque path function 101 to a limit torque BM. The output of limiting element 102 specifies an output quantity for controlling drive engine 2. In an internal combustion engine, this quantity can be a quantity to be injected, which is specified in a suitable manner to an end stage 105 for controlling the injection valves of the internal combustion engine. If the alternative monitoring is not adopted, limiting element 102 outputs an output quantity corresponding to the specified torque VM, or limits this quantity to a specified maximum torque. The maximum torque can be selected high enough that it is never reached by the specified torque, or at least not during normal operation of the drive engine.

Limit torque BM results from a maximum rotational speed regulation according to a maximum rotational speed regulating block 103 to which a maximum permissible engine rotational speed NM is specified as target quantity. The maximum permissible engine rotational speed NM is provided in a maximum rotational speed adaptation block 104 in such a way that abrupt changes in the maximum permissible engine rotational speed NM ascertained therein are avoided.

A rotational speed specification NV is specified to maximum rotational speed adaptation block 104, the specification resulting in a rotational speed specification block 107 according to a prespecified, in particular monotonic, function from driver's request FW, e.g. proportionally as a function of the specified driver's request FW. In particular, rotational speed specification NV can result from a position of gas pedal 11 actuated by the driver.

The adaptation of rotational speed specification NV specified by specified driver's request FW in maximum rotational speed adaptation block 104 is carried out, corresponding to an adaptation function, in such a way that abrupt changes of limit torque BM are prevented. For this purpose, when the alternative monitoring is adopted it can be provided that, if as a result the current engine rotational speed N is greater than the desired maximum permissible engine rotational speed NM, the maximum permissible rotational speed NM is first set to the current engine rotational speed and is led back to the rotational speed specification using a first parameterizable, in particular temporally monotonic, adaptation function. In particular, the first adaptation function can be a temporal ramp function that in particular provides a linear fall-off of the maximum permissible engine rotational speed NM with a specified first time gradient. In this way, a jerky torque reduction and shutoff in the safety-relevant injection are avoided.

In addition, via the parameterization of the adaptation function it can be ensured that no safety-critical state arises.

If, in a different case, the current engine rotational speed N is less than the rotational speed specification NV specified by rotational speed specification block 107 when the alternative monitoring is adopted, the maximum permissible engine rotational speed NM can be immediately adopted and applied to the maximum rotational speed regulator.

In addition, it can be alternatively or additionally provided that, if the alternative monitoring is to be departed from, the maximum permissible engine rotational speed NM is continuously increased not abruptly but rather using a second parameterizable, in particular temporally monotonic, adaptation function, up to a specified maximum rotational speed value (which can be specified by a rotational speed limiting in normal operation) as rotational speed specification NV, in order to request adjacent high specified torques VM, specified by driver's request FW, not abruptly and not predictably for the driver from drive engine 2. In particular, the second adaptation function can be a temporal ramp function that in particular provides a linear increase in the maximum permissible engine rotational speed NM with a predetermined second temporal gradient. The alternative monitoring can be terminated only when there takes place no limitation of the specified torque VM by the limit torque BM, ascertained based on the maximum permissible engine rotational speed NM.

The curves of the first and/or the second adaptation function can be fashioned according to a low-pass function.

If, during the alternative monitoring, the actual engine rotational speed N exceeds the maximum permissible engine rotational speed NM, for example due to a change of gear, the current engine rotational speed N can first be adopted as maximum permissible engine rotational speed NM and can be set to the value of rotational speed specification NV corresponding to the first adaptation function. This gives maximum rotational speed regulator 103 the possibility for torque reduction and avoids unintentional injection shutoff in normal operation.

The maximum rotational speed regulation in maximum rotational speed regulating block 103 corresponds to a conventional rotational speed regulation with a rotational speed difference as input quantity and an indication of the limit torque as actuating quantity; the maximum rotational speed regulation can have a P portion and an I portion.

In addition, an injection shutoff block 106 is provided in order to carry out an injection shutoff if the actual engine rotational speed N, from a rotational speed sensor, exceeds the maximum permissible engine rotational speed NM by a specified first offset value. For this purpose, for an injection shutoff the end stage is controlled such that the controlling of the injection valves is blocked, and fuel is no longer injected into cylinders of the internal combustion engine. At engine rotational speeds N that are between maximum permissible engine rotational speed NM and an injection shutoff rotational speed limit EN, which results from maximum permissible engine rotational speed NM charged with the first offset value, injection shutoffs can now be carried out if the gradient dN/dT of the actual engine rotational speed is greater than a maximum rotational speed gradient dNmax/dT. In this way, the injection shutoff rotational speed limit EN can be increased without infringing safety targets, and emissions-uncritical increases in engine rotational speed N beyond maximum permissible engine rotational speed NM are permitted in a larger rotational speed range.

In addition, it can be provided that the taking into account of the engine rotational speed gradient dN/dt is carried out only starting from a rotational speed threshold value N2 that is above maximum permissible engine rotational speed NM by a specified second offset value, but is smaller than injection shutoff rotational speed limit EN.

In addition, in monitoring block 100 a quality test function can be carried out if the drive system is in the alternative monitoring mode. The quality test provides a check that, if an increase of the driver's request FW is requested, e.g. through a corresponding actuation of gas pedal 11, the maximum permissible engine rotational speed NM resulting in maximum rotational speed adaptation block 104 is not immediately applied to limitation element 102; rather, first a specified holding time duration is waited in order to recognize, on the basis of a change in engine rotational speed N, whether maximum rotational speed regulator 103 and limiting element 102 are correctly limiting specified torque VM.

If there is an error in maximum rotational speed regulator 103 and/or in limiting element 102, then by determining an increase in the engine rotational speed despite a constant specified rotational speed specification NV during the specified holding time duration, an error can be indicated in maximum rotational speed regulator 103 and/or in limiting element 102. If, during the specified holding time duration, the engine rotational speed does not increase, or increases only slightly, or even decreases, although driver's request FW has previously increased, then a properly functioning maximum rotational speed regulator 103 and limiting element 102 can be inferred.

It can be provided that the quality test is not positively terminated if at least one of the following exception conditions is present:

the maintenance of the allowed maximum permissible engine rotational speed NM is due to the injection shutoff activated by the monitoring function.

A brake pedal is actuated during the holding time duration, and injections take place simultaneously, because in this case there is the possibility that an excessively high specified torque VM, not prevented by limiting element 102, has been compensated by a braking intervention of the driver, and as a result engine rotational speed N cannot increase during the holding time duration.

In hybrid drive systems, a recuperation torque of the electric motor prevents or delays an increase in rotational speed of the internal combustion engine with active injections.

If, during the holding time duration, none of the above conditions are recognized, or these are recognized less often than an applicable number, the quality test has been passed, and the alternative monitoring can be departed from. If the quality test is not passed, no definite statement is then yet possible as to whether an error is present. Therefore, it is sought to carry out further quality tests up to an applicable number, and leaving the alternative monitoring can be permanently prevented if the determined number of quality test methods has in no case resulted in a passed quality test.

What is claimed is:

1. A method for operating a drive system having at least one drive engine for a motor vehicle, the method comprising:

monitoring, via a processor and a sensor system, an acceleration of the motor vehicle;

performing, via the processor, an alternative monitoring of another vehicle parameter by changing over to the alternative monitoring when the monitoring of the acceleration can no longer be performed reliably;

ascertaining, via the processor, a maximum permissible rotational speed as a function of a rotational speed specification specified by a driver's request; and limiting, in the alternative monitoring, an engine rotational speed to the maximum permissible engine rotational speed;

wherein a real driving acceleration is compared to a rotational acceleration, which is determined from measured rotational speeds, and wherein monitoring of the acceleration cannot be performed reliably when there is an error in the sensor system or acceleration is outside an operating range in which the acceleration cannot be reliably monitored.

2. The method of claim 1, wherein the maximum permissible engine rotational speed being ascertained so that its time gradient is limited to a prespecified maximum rotational speed gradient.

3. The method of claim 1, wherein the maximum permissible engine rotational speed and a current engine rotational speed are provided, the rotational speed gradient of the maximum permissible engine rotational speed being limited upon at least one of engaging the alternative monitoring, departing from the alternative monitoring, and during the alternative monitoring.

4. The method of claim 1, wherein the alternative parameter of the alternative monitoring includes a specified torque, wherein the specified torque calculated by a torque calculation path from a specified driver's request is limited to a limit torque, the limit torque being ascertained as a function of the driver's request, in particular according to a maximum rotational speed regulation based on a maximum permissible engine rotational speed that is a function of the driver's request.

5. The method of claim 3, wherein the limiting of the rotational speed gradient of the maximum permissible engine rotational speed is carried out by adapting the maximum permissible engine rotational speed according to a specified adaptation function.

6. The method of claim 1, wherein, in the alternative monitoring, when the current engine rotational speed exceeds an injection shutoff rotational speed limit, an injection shutoff is carried out, injections being permitted between an engine rotational speed that is a function of the maximum permissible engine rotational speed and the injection shutoff rotational speed limit only as long as a temporal gradient of the actual engine rotational speed is smaller than a prespecified maximum permissible engine rotational speed gradient.

7. The method of claim 1, wherein the alternative monitoring is departed from after adoption of the alternative monitoring if a quality test runs successfully, the quality test providing that, if an increase of the driver's request is requested, the rotational speed specification is held constant for a specified holding time duration, a successful running of the quality test being determined if, during the holding time duration, there results essentially no change in the engine rotational speed.

8. The method of claim 7, wherein no successful run of the quality test is determined if at least one of the following exception conditions is present:
   (i) the maintenance of the permitted maximum permissible engine rotational speed is due to an activated injection shutoff;
   (ii) a brake pedal is actuated during the holding time duration, and injections take place simultaneously; and
   (iii) in a hybrid drive system, a recuperated torque prevents or delays an increase in rotational speed of the drive engine with active injections.

9. The method of claim 8, wherein no successful run of the quality test is determined if one of the exception conditions is met with a particular frequency within the holding time duration.

10. A device for operating a drive system having at least one drive engine for a motor vehicle, comprising:
   a monitoring arrangement configured to perform the following:
      monitoring, via a processor and a sensor system, an acceleration of the motor vehicle;
      performing, via the processor, an alternative monitoring of another vehicle parameter by changing over to the alternative monitoring when the monitoring of the acceleration can no longer be performed reliably;]
      ascertaining, via the processor, [a maximum permissible rotational speed as a function of a rotational speed specification specified by a driver's request; and
      limiting, in the alternative monitoring, an engine rotational speed to the maximum permissible engine rotational speed;
      wherein a real driving acceleration is compared to a rotational acceleration, which is determined from measured rotational speeds, and
      wherein monitoring of the acceleration cannot be performed reliably when there is an error in the sensor system or acceleration is outside an operating range in which the acceleration cannot be reliably monitored.

11. A drive system, comprising:
   at least one drive engine; and
   a device for operating the drive system having the at least one drive engine, including:
      a monitoring arrangement configured to perform the following:
         monitoring, via a processor and a sensor system, an acceleration of the motor vehicle;
         performing, via the processor, an alternative monitoring of another vehicle parameter by changing over to the alternative monitoring when the monitoring of the acceleration can no longer be performed reliably;]
         ascertaining, via the processor, [a maximum permissible rotational speed as a function of a rotational speed specification specified by a driver's request; and
         limiting, in the alternative monitoring, an engine rotational speed to the maximum permissible engine rotational speed;
         wherein a real driving acceleration is compared to a rotational acceleration, which is determined from measured rotational speeds, and
         wherein monitoring of the acceleration cannot be performed reliably when there is an error in the sensor system or acceleration is outside an operating range in which the acceleration cannot be reliably monitored.

12. The device of claim 10, wherein the device includes an engine control device.

13. A non-transitory machine-readable storage medium having a computer program, which is executable by a processor, comprising:
   a program code arrangement having program code for operating a drive system having at least one drive engine for a motor vehicle, by performing the following:
      monitoring, via the processor and a sensor system, an acceleration of the motor vehicle;
      performing, via the processor, an alternative monitoring of another vehicle parameter by changing over to the alternative monitoring when the monitoring of the acceleration can no longer be performed reliably;]
      ascertaining, via the processor, [a maximum permissible rotational speed as a function of a rotational speed specification specified by a driver's request; and
      limiting, in the alternative monitoring, an engine rotational speed to the maximum permissible engine rotational speed;
      wherein a real driving acceleration is compared to a rotational acceleration, which is determined from measured rotational speeds, and
      wherein monitoring of the acceleration cannot be performed reliably when there is an error in the sensor system or acceleration is outside an operating range in which the acceleration cannot be reliably monitored.

14. The method of claim 3, wherein the limiting of the rotational speed gradient of the maximum permissible engine rotational speed is carried out by adapting the maximum permissible engine rotational speed according to a specified, in particular a temporally monotonic, adaptation function.

15. The method of claim 1, wherein the alternative monitoring is departed from after the engaging of the alternative monitoring if a quality test runs successfully, the quality test providing that, if an increase of the driver's request is requested, the rotational speed specification is held constant for a specified holding time duration, a successful running of the quality test being determined if, during the holding time duration, there results essentially no change in the engine rotational speed, in particular no increase in the engine rotational speed.

* * * * *